(No Model.)
G. W. SIKES.
HORSE DETACHER.
No. 432,911. Patented July 22, 1890.
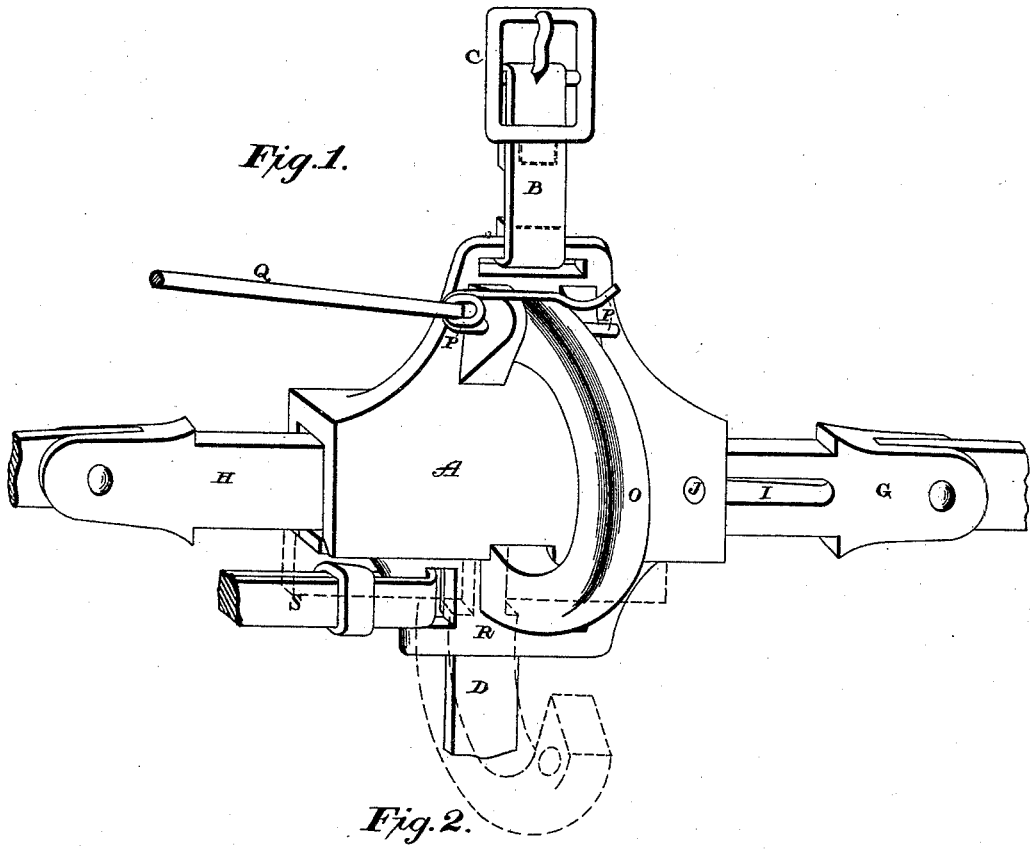
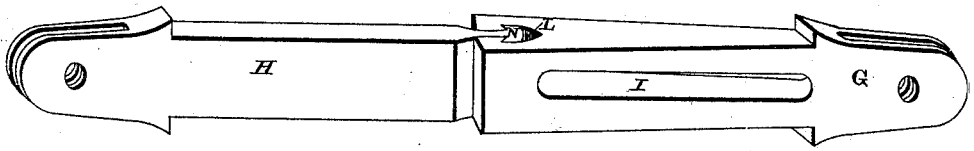
Witnesses:
E. P. Ellis
B. Brockett
Inventor:
G. W. Sikes
per Lehmann & Pattison,
Attys.
THE NORRIS PETERS CO., PHOTO-LITHO., WASHINGTON, D. C.

UNITED STATES PATENT OFFICE.

GEORGE WASHINGTON SIKES, OF HOPE, MISSISSIPPI.

HORSE-DETACHER.

SPECIFICATION forming part of Letters Patent No. 432,911, dated July 22, 1890.

Application filed April 21, 1890. Serial No. 348,836. (No model.)

*To all whom it may concern:*

Be it known that I, GEORGE WASHINGTON SIKES, of Hope, in the county of Neshoba and State of Mississippi, have invented certain new and useful Improvements in Horse-Detachers; and I do hereby declare the following to be a full, clear, and exact description of the invention, such as will enable others skilled in the art to which it pertains to make and use it, reference being had to the accompanying drawings, which form part of this specification.

My invention relates to an improvement in horse-detachers; and it consists in the combination and arrangement of parts, which will be more fully described hereinafter.

The object of my invention is to provide an apparatus which is connected directly to the harness and by means of which a runaway horse can be detached from the vehicle at any moment.

Figure 1 is a perspective of an apparatus which embodies my invention, the parts being shown in one position in solid lines and in another position in dotted lines. Fig. 2 is a perspective of the two castings which are attached to the two parts of the trace.

A represents a suitable frame, which is secured to the saddle-strap of the harness by means of the short strap B, which is fastened to the frame at its upper edge and provided with a buckle C. Secured to a loop on the inner side of this frame A is a girth-strap D, and between the two straps B D the frame A is attached to the harness, so as to form a part thereof. This frame has an opening through its lower edge, so as to receive the two castings G H, which are fastened to the two inner ends of the divided trace. The ordinary trace must be cut in two and each of its inner ends must be secured to one of these castings G H. The casting G consists of a bar of suitable length having a socket formed in its front end to receive the front portion of the trace and provided with a slot I of suitable length through which a pin J passes. This pin J is passed horizontally through the front end of the frame A and through the slot I and allows the casting G a free endwise movement, but prevents it from becoming separated from the frame A. In the inner end of this casting G is formed a suitable socket L, in which a spear-shaped end N of the casting H is made to catch for the purpose of uniting the two castings G H. These two castings unite the two inner ends of the trace until it is desired to detach the runaway animal from the buggy.

Pivoted to the lower inner edge of the frame A is the hook O, which takes the place of the ordinary shaft-tug and supports the shaft in position along the side of the animal. While supporting the shaft in position, this hook is locked in place by means of a spring-pin P, which has a strap Q connected to its rear end and extends back into the buggy to the driver. When the pin is withdrawn by the driver through a pull upon the strap, the hook turns downward both from its own weight and the weight of the shaft. Secured to this hook is a perforated bar or support R, which closes the lower side of the frame A when the hook is turned up in position, and thus forms a support for the two castings G H, so as to hold them in position to properly unite the two parts of the trace. When the hook drops, the support is moved away from the lower edge of the frame A and allows the two castings G H to separate. The front casting G always remains attached to the harness; but the rear one H remains attached to the singletree by means of the rear part of the trace. To this support is fastened one of the holdback-straps S.

Before this apparatus can be used upon the ordinary buggy-shafts the usual hooks or fastenings for the holdback-straps must be removed. After the frame A has been substituted for the ordinary tug, each trace must be cut in two, and the inner end of each part of each trace must be fastened to one of the castings G or H. In order to insert the inner ends of these two castings into the frame A, the locking-pin must be withdrawn and the hook and the support attached thereto must be dropped. While the hook is in the dropped position shown in dotted lines the shaft can be inserted into place, and then the hook is raised and the pin passed through the lugs T on the upper part of the frame A and the upper end of the hook. The slot in the casting G allows the trace to move back and forth as freely as it would do if no castings were used.

When it becomes necessary to detach the runaway animal, it is only necessary for the driver to exert a pull upon the strap Q, when the pins will be withdrawn, the hook will drop, the casting H will drop by its own weight from the casting G, which remains attached to the frame A, and then the animal becomes detached from the vehicle, taking all of the harness with it, except the two rear portions of the traces, which remain attached to the singletree. By this construction the driver can detach the animal whenever it runs away, or for any reason it becomes desirable to quickly unhitch it.

Having thus described my invention, I claim—

1. In a horse-detacher, the combination of a frame provided with a longitudinal opening in its under side, the two detachable castings for securing the ends of the trace together, and a detachable support for closing the lower edge of said opening, substantially as shown.

2. The combination of the frame A, the hook pivoted thereto and perforated support secured to the hook, the two castings G H for uniting the two parts of the divided trace, a locking-pin, and a strap or cord connected thereto, substantially as set forth.

3. In a horse-detacher, the combination of a frame having a longitudinal opening in its under side, two castings secured to the trace at their outer ends and their inner ends provided with detachable sockets, and a detachable support for closing the lower edge of said horizontal opening, substantially as shown and described.

4. In a horse-detacher, the combination of the frame provided with a longitudinal opening in its under side for the trace, a support for closing the lower edge of the opening, an upwardly and outwardly projecting hook having its lower end secured to the support and its upper end detachably connected to the upper portion of the frame, whereby the hook forms an opening between it and the frame which serves as a support for the shaft and at the same time supports the trace, substantially as shown and described.

In testimony whereof I affix my signature in presence of two witnesses.

GEORGE WASHINGTON SIKES.

Witnesses:
J. C. SIKES,
W. T. LOFTON.